United States Patent [19]

Slagel et al.

[11] 4,351,817
[45] Sep. 28, 1982

[54] CARBON BLACK PROCESS

[75] Inventors: John E. Slagel; Allen C. Howard, both of Orange, Tex.

[73] Assignee: Phillips Petroleum Company, Bartlesville, Okla.

[21] Appl. No.: 973,656

[22] Filed: Dec. 27, 1978

Related U.S. Application Data

[62] Division of Ser. No. 764,665, Feb. 1, 1977, Pat. No. 4,138,217.

[51] Int. Cl.³ .............................................. C09C 1/50
[52] U.S. Cl. .................................... 423/450; 423/456; 423/461
[58] Field of Search ............... 423/450, 455, 456, 457, 423/461; 422/150, 151; 260/679 R; 261/115–118

[56]   References Cited
U.S. PATENT DOCUMENTS

| | | | |
|---|---|---|---|
| 2,817,690 | 12/1957 | Lobo | 260/679 R |
| 2,897,062 | 7/1959 | Minarik | 260/679 R |
| 2,913,232 | 11/1959 | Silverman | 261/40 |
| 3,011,872 | 12/1961 | Webster | 423/456 |
| 3,153,104 | 10/1964 | Sprauer | 260/679 R |
| 3,410,660 | 11/1968 | Henderson et al. | 423/456 X |
| 3,965,690 | 6/1976 | Berryhill | 261/115 |

Primary Examiner—Edward J. Meros

[57] ABSTRACT

A carbon black reactor is comprised of a housing which defines a precombustion zone, a reaction zone and a quench zone which are in flow communication. Inlet means open into the precombustion zone or the reaction zone and is operable to introduce make hydrocarbon into the reactor. Also, inlet means open into the precombustion zone and is operable for the introduction of hot combustion gases into the precombustion zone. The make hydrocarbon is pyrolyzed by contact with the hot combustion gases as same flow along the reaction zone. After a predetermined time as determined by the length of flow along the reaction zone, the effluent produced by the pyrolysis of the make hydrocarbon by contact with the combustion gases is quenched to stop the reaction. A tubular member extends into the quench zone and has oppositely directed discharge openings on opposite sides thereof wherein a fluid coolant is introduced into the quench zone through the openings to form a curtain of coolant across the width of the quench zone through which the effluent must pass wherein same is cooled by contact with the coolant.

1 Claim, 6 Drawing Figures

CARBON BLACK PROCESS

This is a division of application Ser. No. 764,665, filed Feb. 1, 1977, now U.S. Pat. No. 4,138,217.

Many devices have been used to effect quenching of the reaction in a carbon black reactor to stop the pyrolysis of the make hydrocarbon. However, some of the difficulties in the past have exemplified themselves in nonuniform quenching and incomplete quenching which then results in lower quality carbon black because of the variation in particle size distribution and in the photelometer thereof. Nozzles of many kinds and positions are known in the art and are somewhat effective to accomplish the quenching. However, one of the problems is that to have a nozzle effective to provide a spray of coolant such as water into the quench zone a large nozzle and feed pipe have been required which then in turn provides resistance to flow for the effluent. Typical of this type of fluid injector is the nozzle disclosed in U.S. Pat. No. 2,897,062, issued July 28, 1959 wherein radially directed discharge openings introduce water into the quench zone. Also, inwardly radially directed water quench ports are known as discussed in U.S. Pat. No. 3,011,872, issued Dec. 5, 1961, but such do not provide a uniform distribution of coolant across the quench zone. The present invention provides an improved coolant injector which is effective to form a uniform distribution of coolant across the quench zone, and of relatively narrow length along the direction of the effluent or smoke flow, to provide rapid and uniform cooling of the effluent flowing along the quench zone. The injection means of the present invention provides minimal resistance to flow. Also, the injection means is of simple construction and inexpensive to manufacture from readily available materials without costly machining.

The principal objects and advantages of the present invention are: to provide a carbon black reactor with an improved coolant or quench injection means which will result in a more uniform distribution of coolant across the quench zone which will result in a more uniform quenching of the effluent especially needed at the prequench position; to provide such an apparatus which is simple in construction and easy to maintain and manufacture; and to provide such an apparatus which is well adapted for its intended use.

Other objects and advantages of the present invention will become apparent from the following detailed description taken in connection with the accompanying drawings wherein are set forth by way of illustration and example certain embodiments of this invention.

Figure 1:
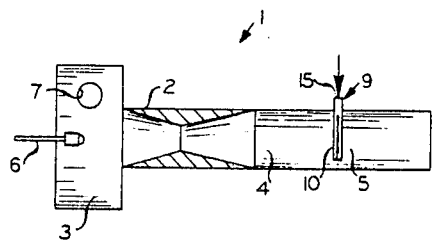
FIG. 1 is a somewhat schematic illustration of a carbon black reactor embodying the present invention.
Figure 2:
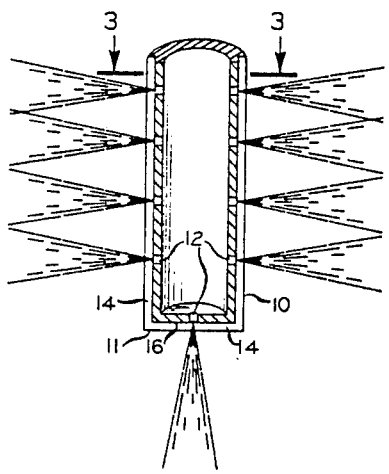
FIG. 2 is an enlarged sectional view showing structural details of the injection means.

Referring more in detail to the drawings

The reference numeral 1 designates generally a carbon black producing apparatus or reactor which can be of any suitable type such as those known in the art as is disclosed in U.S. Pat. No. 2,564,700. A housing 2 forms the reactor and has positioned therein a precombustion zone 3 which has in communication therewith a reaction zone 4 which is flow-wise downstream of the precombustion zone and downstream of the reaction zone 4 is a quench zone 5. There is no sharp line of demarcation between the particular zones and same are determined by the particular process taking place therein. In communication with the precombustion zone 3 there is provided a make-hydrocarbon, sometimes called oil, injector 6 which is operable for the injection of a make-hydrocarbon into either the precombustion zone 3 or the reaction zone 4. Also, there is provided in the precombustion zone 3 inlet means 7 which is operable for introducing hot combustion gases which can be a combustible fuel and air or oxygen or a burning mixture of same into the precombustion zone 3 wherein same by contact with the make-hydrocarbon pyrolyzes the make-hydrocarbon to form a carbon black particle containing effluent, usually referred to as smoke. The pyrolysis takes place in the reaction zone and after a predetermined time, a certain type of black, i.e., as determined by the particle size, structure, photelometer, etc., is formed. Depending upon the particular carbon black desired to be formed, the pyrolysis reaction is stopped by quenching or prequenching the smoke effluent which is preferably accomplished by direct contact with a coolant such as water or steam. This can also be accomplished by contact with a cool gas such as nitrogen or recycled smoke. However, one of the preferred coolants is water.

Although a vortex or swirl type reactor is illustrated it is to be understood that any suitable type of reactor can be used with the present invention.

Figure 4:
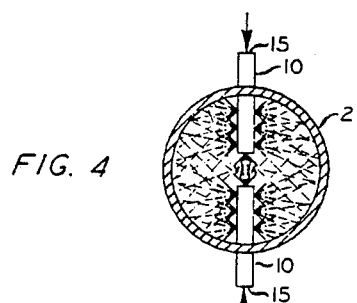
FIG. 4 is a schematic view of a modified form of the invention.
Figure 5:
FIG. 5 is a schematic view of a modified form of the invention.

The quench zone has extending thereto an injector or inlet means 9 which, as shown, is comprised of a hollow tubular member 10 which extends into the quench zone, i.e., generally from one side to an opposing side, and preferably same extends through the center or the longitudinal axis of the quench zone. However, this position can be varied if two or more of the injectors are used. Many arrangements can be made if a plurality of tubular members are used. Also, a free end 11 can have a discharge orifice 12 to direct spray of coolant from the end. In the form shown in FIG. 1, one tubular member is positioned generally perpendicular or normal to the longitudinal axis of the quench zone and has the free end 11 thereof positioned adjacent to a side of the quench zone opposite the side which the tubular member extends through the housing 2. When one tubular member is used it is preferred that same extend substantially across the width of the quench zone, i.e., more than half way. The tubular member 10 has a plurality of discharge openings 12 positioned generally on opposite sides thereof and are directed to spray a coolant in a plane generally transverse to the longitudinal axis of the quench zone. However, the tubular member 10 can be canted in an upstream or downstream direction and still achieve acceptable results. Also, the discharge openings 12 can be directed somewhat upstream or downstream, say for example up to about 30° and still achieve adequate cooling. Therefore, the term "generally transverse" is to be broadly interpreted. The feature of the tubular member as the coolant injector is that by having the discharge opening directed generally transverse is that a curtain of coolant is provided across substantially the entirety of the cross section of the quench zone. This can be accomplished with one or more tubular members, as for example: two tubular members extending into the quench zone from opposite sides and being generally diametrically opposed (FIG. 4), a plurality of tubes circumferentially spaced apart and extending radially into the quench zone (FIG. 5), etc.

Figure 3:
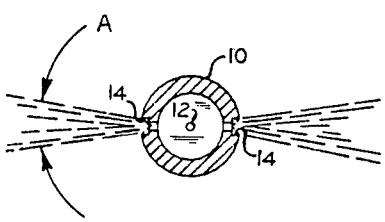
FIG. 3 is a sectional view of the injection means taken along the line 3—3, FIG. 2.
Figure 6:
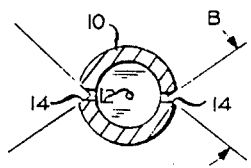
FIG. 6 is a sectional view, similar to FIG. 3, of a modified form of the injection means.

In a preferred form of the invention, the tube has certain of the discharge openings 12 on one side and the remaining discharge openings on the other side, i.e., 180° apart on a round tube, and are directed away from the tube and are generally normal to the longitudinal axis of the tubular member 10. It is preferred to help form a wide spray, in a plane transversely across the quench zone and with a narrow spray angle A to form a relatively thin curtain, that grooves 14 be recessed inwardly from the outer surface of the tube as, for example, approximately 1/16" (0.159 cm) deep with the discharge openings 12 on the respective side opening into the respective groove 14. These grooves may be "V" shaped with the hole at the bottom or apex of the "V" as seen in FIG. 6 or generally rectangularly shaped as seen in FIG. 3. The angle B preferably is between about 15° and 60° and preferably between about 30° and 45°. It has been found by actual operation in a 15-inch diameter reactor zone that a tubular member 10 having an outside diameter of approximately ¾ inch (1.91 cm) is adequate to supply sufficient water to effect the quenching.

It is preferred to achieve uniform distribution of coolant from the injector 9 that discharge openings in various positions or of various sizes can be used. One way to achieve a uniform distribution is by having the discharge openings in varying spaced distances along the length of the tubular member 10 wherein the space between the discharge openings decreases the further from an inlet end 15 of the tubular member whereby pressure drop in the coolant along the length of the tube, i.e., the closed end 16 of the tube having the lowest pressure has the discharge openings more closely spaced together then the discharge openings 12 adjacent the inlet end 15 to provide for a uniform flow rate into the quench zone along the length of the tubular member 10. This provides for a more uniform amount of water to be introduced transversely across the area of the quench zone, whether it be adjacent the inlet end 15 or the closed end 16.

Another way to achieve uniform distribution of coolant across the width of the quench zone is to have the discharge openings sized differently wherein the further from the inlet end the larger diameter the discharge opening so as to allow a uniform flow rate of coolant into the respective areas of the quench zone. The further from the inlet end, the larger the discharge opening, i.e., the discharge opening size increases away from the inlet end. The exact size or positions of the discharge openings 12 can be determined by calculation or trial and error to achieve optimum distribution of coolant.

A third way to assure more uniformity of coolant into the quench zone is by determination of the area into which the particular discharge opening must inject coolant to effect the cooling whereby at a position adjacent the center of the quench zone the discharge opening most adjacent thereto having more cross-sectional area across the width of the quench zone by virtue of being further from the side of the quench zone at which same is directed wherein the discharge opening adjacent the center is slightly larger than those positioned on opposite sides thereof. Therefore, this compensates for both pressure drop and area across which the coolant must be distributed from the particular discharge opening.

Prequench lowers the smoke temperature to below carbon black forming conditions, e.g., to below about 2100° F. (1150° C.). Final water cooling is to about 1200° F. (649° C.). Smoke is further cooled by indirect exchange to about 450° F. (232° C.).

By way of operation, the following calculated example is provided to show operability of the present invention.

| Reactor Unit: | |
|---|---|
| Precombustion Zone | |
| Diameter, inches, | 39 (99.06 cm) |
| Length, inches, | 12 (30.48 cm) |
| Reaction Tube: (measured from downstream end of the precombustion zone) | |
| Length, inches | 112 |
| Diameter, inches, | 15 (38.10 cm) |
| Length to Prequench, inches, | 48* (121.92 cm) |
| Length to Final Quench, inches, | 112 (284.48 cm) |
| Operation: | |
| Make Oil, 120 BMCI, 700° F. (371.1° C.) Mid-Boiling Point (Aromatic Oil), gallons/hr, | 325 (1230.13 liters/hr) |
| Tangential Air, SCF/hr, | 210,000 (5950.69 m$^3$/hr) |
| Tangential Fuel Gas, (Methane) SCF/hr, | 13,680 (387.65 m$^3$/hr) |
| Axial Air, SCF/hr, | 4,000 (113.35 m$^3$/hr) |
| Prequench Water at 100° F. (37.8° C.) g/h, (to about 2000° F.) | 175 (586.68 liters/hr) |
| Final Quench Water at 100° F. (37.8° C.) g/h, (to about 1200° F.) | 450 (1703.25 liters/hr) |
| Carbon Black Properties (pelleted and dried): | |
| Based on prequenching at the 48" prequench locus | |
| N$_2$SA, m$^2$/gm, (1) | 99 |
| CTAB, m$^2$/gm, (2) | 100 |
| 24M4, DBP, cc/100 gm, (3) | 101 |
| Photelometer, (4) | 86 |
| The Prequench Tube: | |
| External Diameter, inches, | 11/16 (1.746 cm) |
| Internal Diameter, inches, | 7/16 (1.111 cm) |
| Size of Orifices, diameter, inches, | 1/16 (0.159 cm) |
| Size of Groove: | |
| Width, inches, | 1/16 (0.159 cm) |
| Depth, inches, | 1/16 (0.159 cm) |
| Spacing of Orifices: | |
| First Set (180° apart), inches from inside of reactor wall adjacent the inlet end of tube | 4½ (11.43 cm) |
| Second Set from First, inches | 1¾ (3.94 cm) |
| Third Set from Second, inches | 1½ (3.81 cm) |
| Fourth Set from Third, inches | 1¼ (3.18 cm) |
| Fifth Set from Fourth, inches | 1 (2.54 cm) |
| Sixth set from Fifth, inches | ½ (1.27 cm) |
| Distance of Closed End from Reactor Inner Wall, inches, | 4½ (11.43 cm) |

*(Prequench pipes are at 36" (91.44 cm), 42" (106.68 cm), 48" (121.92 cm) and one is selected for that type carbon black to be made)
(1) ASTM D-3037-71T, Method A;
(2) Janzen, J. and Kraus, G., Rubber Chemistry and Technology, 44, 1287 (1971);
(3) U.S. Pat. No. 3,548,454 as measured after crushing by Method B, ASTM-D2414-70;
(4) ASTM D-1618-58T.

By use of the present invention, more efficient, uniform, rapid cooling of the effluent should be realized wherein less water could be used to attain the desired prequenching result over various injection means currently used, or for the same amount of quench liquid introduced it is believed that a more uniform particle distribution which would result in higher tinting strength (ASTM D-3265-75) can be realized.

It is to be understood that while there has been illustrated and described certain forms of this invention it is not to be limited to the specific form or arrangement of parts herein described and shown except to the extent that such limitations are found in the claims.

That which is claimed is:

1. A method of producing carbon black comprising the steps of:
   producing hot combustion gases;
   contacting a make hydrocarbon with said thus produced hot combustion gases in a rection zone and thereby pyrolyzing said make hydrocarbon so as to produce an effluent comprising carbon black;
   flowing said thus produced effluent along a quench zone having a longitudinal axis;
   introducing quench liquid into said quench zone from a plurality of oppositely directed discharge openings lying in a plane generally transverse to the longitudinal axis of the quench zone and being spaced apart at different distances outwardly from the longitudinal axis of such quench zone and extending substantially across the cross section of said quench zone so as to form a curtain of quench liquid extending substantially across the entirety of the cross-section of the quench zone.